United States Patent [19]

Röhm

[11] Patent Number: 4,582,331
[45] Date of Patent: Apr. 15, 1986

[54] FAST-RELEASE POWER-CHUCK ASSEMBLY FOR A LATHE

[76] Inventor: Günter H. Röhm, Heinrich-Röhm-Str. 50, 7927 Sontheim, Fed. Rep. of Germany

[21] Appl. No.: 637,401

[22] Filed: Aug. 3, 1984

[30] Foreign Application Priority Data

Aug. 5, 1983 [DE] Fed. Rep. of Germany ....... 3328291

[51] Int. Cl.$^4$ .............................................. B26C 5/00
[52] U.S. Cl. .......................................... 279/4; 92/24; 92/27
[58] Field of Search .............. 279/4; 409/233; 91/420; 92/106, 23, 24, 27, 28

[56] References Cited

U.S. PATENT DOCUMENTS

| | | | |
|---|---|---|---|
| 2,811,136 | 10/1957 | Westcott et al. | 92/24 X |
| 3,762,264 | 10/1973 | Scott | 279/4 X |
| 3,893,371 | 7/1975 | Frazier | 409/233 X |
| 4,411,440 | 10/1983 | Becker | 279/4 X |

Primary Examiner—Douglas D. Watts
Attorney, Agent, or Firm—Karl F. Ross; Herbert Dubno

[57] ABSTRACT

A power chuck assembly has a lathe spindle extending along and rotatable about an axis and having axially opposite front and rear ends. An axially displaceable actuator rod extends at the axis through the spindle and has front and rear rod ends at the respective spindle ends. This rod is rotatable about the axis between two angularly offset end positions. A coupling head secured to the front spindle end has a plurality of bolts displaceable radially between inner and outer positions. A chuck provided with an axially rearwardly projecting annular flange engageable over the head is formed with at least one radially but not axially open recess in which the bolts are engageable in the outer positions thereof. Actuators are connected to the bolts for displacing them from the inner to the outer positions so that, when the chuck is fitted over the coupling head, the bolts engage in the recess and axially lock the chuck on the coupling head. An actuating element is axially displaceable in the chuck for gripping and releasing a workpiece, normally by radially displacing jaws on the chunk. Interengageable coupling formations on the front rod end and on the actuating element are axially engageable with each other for axially coupling the rod to the element in one angular end position of the spindle and axially unengageable with each other in the other angular end position for axially decoupling the rod and element. A linear actuator is connected between the rear spindle and rod ends for relatively axially displacing the spindle and rod and thereby axially displacing the actuating element of a chuck engaged on the head.

11 Claims, 7 Drawing Figures

FAST-RELEASE POWER-CHUCK ASSEMBLY FOR A LATHE

FIELD OF THE INVENTION

The present invention relates to a lathe. More particularly this invention concerns a power-chuck assembly for a lathe.

BACKGROUND OF THE INVENTION

A power chuck or mandrel such as described in my earlier patents has a chuck or mandrel body centered on and rotatable about the axis of a headstock on which it is mounted. Normally jaws or similarly effective elements on the chuck body can be displaced radially by axial displacement of a central actuating member. In a standard chuck this actuating member may have a plurality of hooks with inclined faces that engage oppositely inclined faces of the jaws so that displacemennt of the hooks cams the jaws radially in or out depending on the axial displacement direction. In a power mandrel the actuating member is a piston which pressurizes the interior of an outwardly swellable sleeve that engages the inner surface of a tubular workpiece or of a bore in a workpiece or tool. Hereinafter the term "chuck" is used exclusively to cover a mandrel or other workpiece- or tool-holding device.

Such a chuck can be actuated as described in my copending application Ser. No. 580,461 filed 15 February 1984 by a device having a cylinder extending along an axis and a piston axially displaceable in the cylinder and forming therein two compartments. The cylinder has an axially backwardly extending stem also centered on the axis and formed with two respective passages each having one end opening into a respective one of the compartments and another end opening at a respective location on the stem. A connector is rotatable about the axis on the stem and provided with respective fittings communicating with the locations, which are normally constituted as radially inwardly open grooves into which the ends of the respective passages open. Bearings prevent the connector from moving axially on the stem. Fluid is fed under pressure alternately to the fittings to pressurize and depressurize the respective compartments and thereby urge the piston in respective axial directions in the cylinder. The cylinder is connected to a chuck body and the piston to a chuck-actuating member for fluid actuation of the member. Respective double check valves in each of the passages inhibit flow out of the respective compartments unless the other passage is pressurized. Each such double check valve includes a respective valve body axially displaceable in the cylinder radially outside the piston.

In such arrangements the chuck is secured to the outer end of the spindle by means of a plurality of cap screws. A stubby cylindrical projection formed on the spindle end and centered on the chuck axis fits in a complementary cylindrical recess of the back or inner face of the chuck. When the chuck is to be changed it is necessary to individually withdraw these screws, take off no longer wanted chuck, mount the new chuck, and reinsert the screws. Such a procedure is highly disadvantageous in modern machine installations where a lathe is used with a variety of different chucks, which for instance have previously been manually fitted to workpieces so that these workpieces can be machined automatically.

OBJECTS OF THE INVENTION

It is therefore an object of the present invention to provide an improved power-chuck assembly for a lathe.
Another object is the provision of such a power-chuck assembly for a lathe which overcomes the above-given disadvantages, that is which allows relatively rapid switching of one power chuck for another.

SUMMARY OF THE INVENTION

A power chuck assembly according to this invention has a lathe spindle extending along and rotatable about an axis and having axially opposite front and rear ends. An axially displaceable actuator rod extends at the axis through the spindle and has front and rear rod ends at the respective spindle ends. This rod is rotatable about the axis between two angularly offset end positions. A coupling head secured to the front spindle end has a plurality of bolts displaceable radially between inner and outer positions. A chuck provided with an axially rearwardly projecting annular flange engageable over the head is formed with at least one radially but not axially open recess in which the bolts are engageable in the outer positions thereof. Actuators are connected to the bolts for displacing them from the inner to the outer positions so that, when the chuck is fitted over the coupling head, the bolts engage in the recess and axially lock the chuck on the coupling head. An actuating element is axially displaceable in the chuck for gripping and releasing a workpiece, normally by radially displacing jaws on the chuck. Interengageable coupling formations on the front rod end and on the actuating element are axially engageable with each other for axially coupling the rod to the element in one angular end position of the spindle and axially unengageable with each other in the othr angular end position for axially decoupling the rod and element. A linear actuator is connector between the rear spindle and rod ends for relatively axially displacing the spindle and rods and thereby axially displacing the actuating element of a chuck engaged on the coupling head when the rod is in the one angular end position. A rotary actuator connected between the spindle and rod can rotate the rod between its end positions and thereby axially couple and uncouple it from the actuating element of a chuck engaged over the head.

In addition the chuck is formed with a rearwardly flaring seat and the coupling head has a complementary forwardly tapering projection snugly engageable therein with the head and body coaxial. The bolts and recess have mutally engageable surfaces forming a forwardly directed acute angle with the axis. Thus engagement of the bolts in the recess with engagement of these surfaces pulls the chuck axially backward to fit the projection into the seat. In this manner, even though the coupling of the chuck to the spindle and rod is effected very simply and rapidly, the chuck will be perfectly centered on the axis and very solidly mounted.

The recess in accordance to this invention can be a plurality of respective pockets. For a simpler fit it is a radially inwardly open groove having a rear flank forming the respective one of the surfaces. In this case the chuck and coupling head have axially interengaging formations offset from the axis that rotationally couple the head to the chuck fitted over it. This structure makes fitting the chuck onto the coupling head fairly easy, while still ensuring perfect positioning as described above.

According to further features of this invention a locking ring axially shiftable on but rotatably coupled to the front rod end has a plurality of radialy outwardly open notches displaceable between the rod end positions. The inner ends of the bolts are radially engageable in the notches for movement of the bolts into the inner positions only in the other end position of the rod and ring. These inner bolt ends are engageable radially inward against the cylindrical outer periphery of the ring between the notches and therefore are unable to move into the inner positions in the one end position of the rod and ring.

The bolts are formed with respective radially movable pistons and the head is formed around these pistons with respective radially extending cylinders. The actuating means according to the invention is formed with an axially rearwardly open pocket and the coupling formations between the front rod end and actuating element include a plurality of radially outwardly projecting teeth on the front rod end in the pocket and a plurality of radially inwardly projecting teeth on the element in the pocket and displaceable in the other end position of the rod axially past and between the rod teeth. Such a coupling can transmit considerable traction, which is the way the actuating element normally must move to close a chuck on a workpiece, while remaining relatively simple in construction.

The rotary actuator is between the rear spindle and rod ends and includes a vane-type piston rotationally but not axially fixed on the rod and a cylinder surrounding and defining a pair of compartments with the piston and carried on the spindle. Similarly, the linear actuator incudes a double-acting piston on the rear rod end, and a cylinder around and defining a pair of compartments with the double-acting piston and on the spindle rear end. A distributor is rotatably carried on the spindle and is connected therethrough to all the compartments. Double check valves are provided between the distributor and the compartments for inhibiting flow out of any compartment of either pair unless the other compartment of the respective pair is pressurized. Thus momentary pressure failure will not cause the system to release, but will leave it locked in whatever position it is in.

DESCRIPTION OF THE DRAWING

The above and other features and advantages will become more readily apparent from the following, reference being made to the accompanying drawing in which.

SPECIFIC DESCRIPTION

Figure 1:
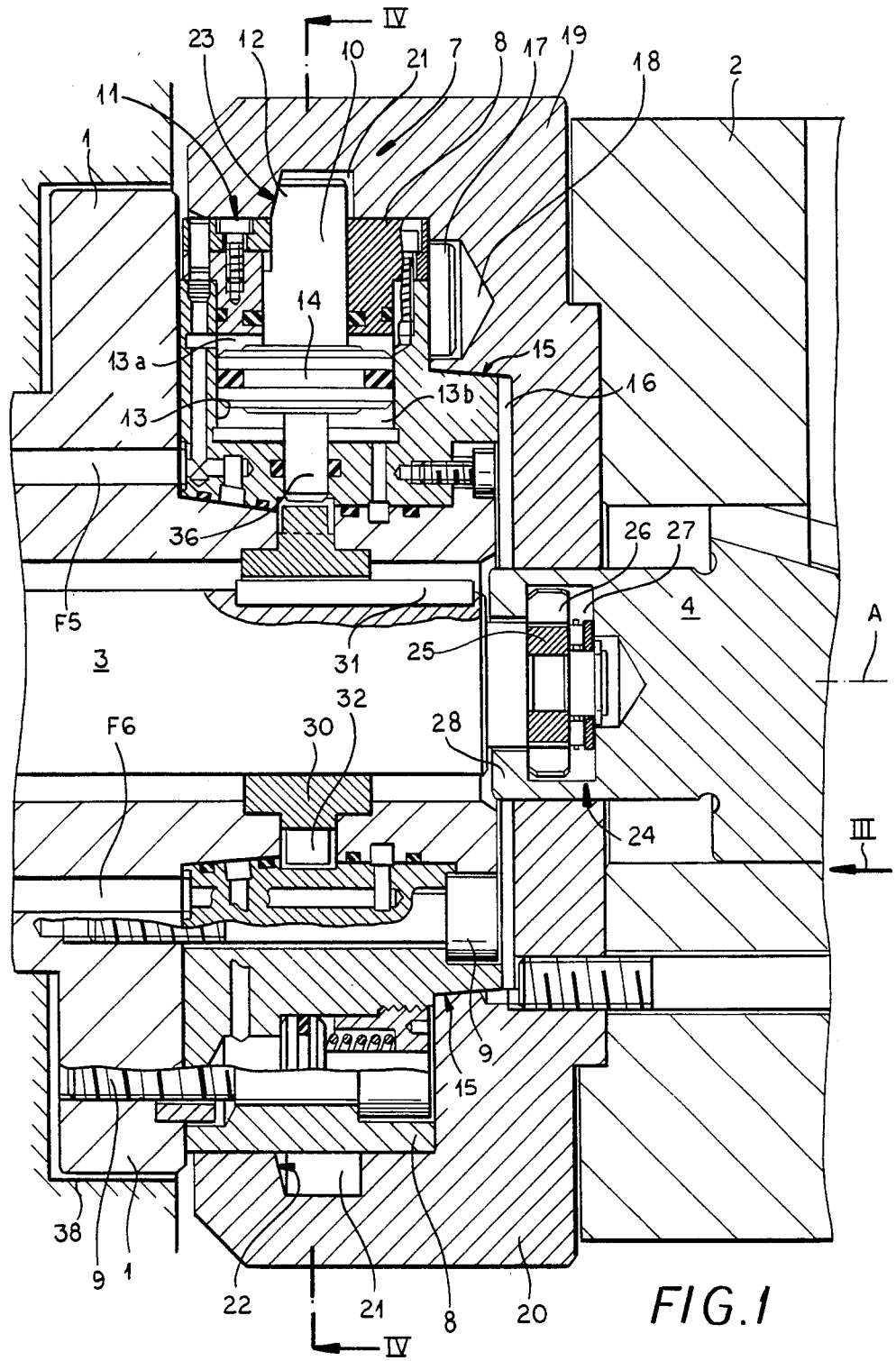
FIG. 1 is an axial section through the front chuck end of the assembly according to this invention.

As seen in FIG. 1, a chuck 2, which may be of the type described in my above-mentioned patent applications, is centered on an axis A, and has a centrally recessed and rearwardly directed face secured by screws 9 to the complementarily shaped front face of a fast-release adapter plate 19. A quick-release head 7 is secured by further screws 9 to the front end of a lathe spindle 1 which is rotatable about the axis A in a stationary part of a lathe headstock indicated at 38. A frustoconical projection 15 centered on the axis A fits snugly in a complementarily frustoconical recess 16 in the rear of the plate 19, so as perfectly to center the chuck 2 on the axis A. An actuating element 4 which serves to displace the jaws or other workpiece-engaging parts of the chuck 2, is movable axially and is connected to the front end of an axially reciprocal shaft 3. At least one axially projecting coupling pin 17 is provided on the front face of the coupling head 7 offset from the centering projection 15 and is received in a similarly shaped recess 18 so as rotationally to couple the head 7 and spindle 3 to the chuck 2 by means of the adapter plate 19.

Figure 2:
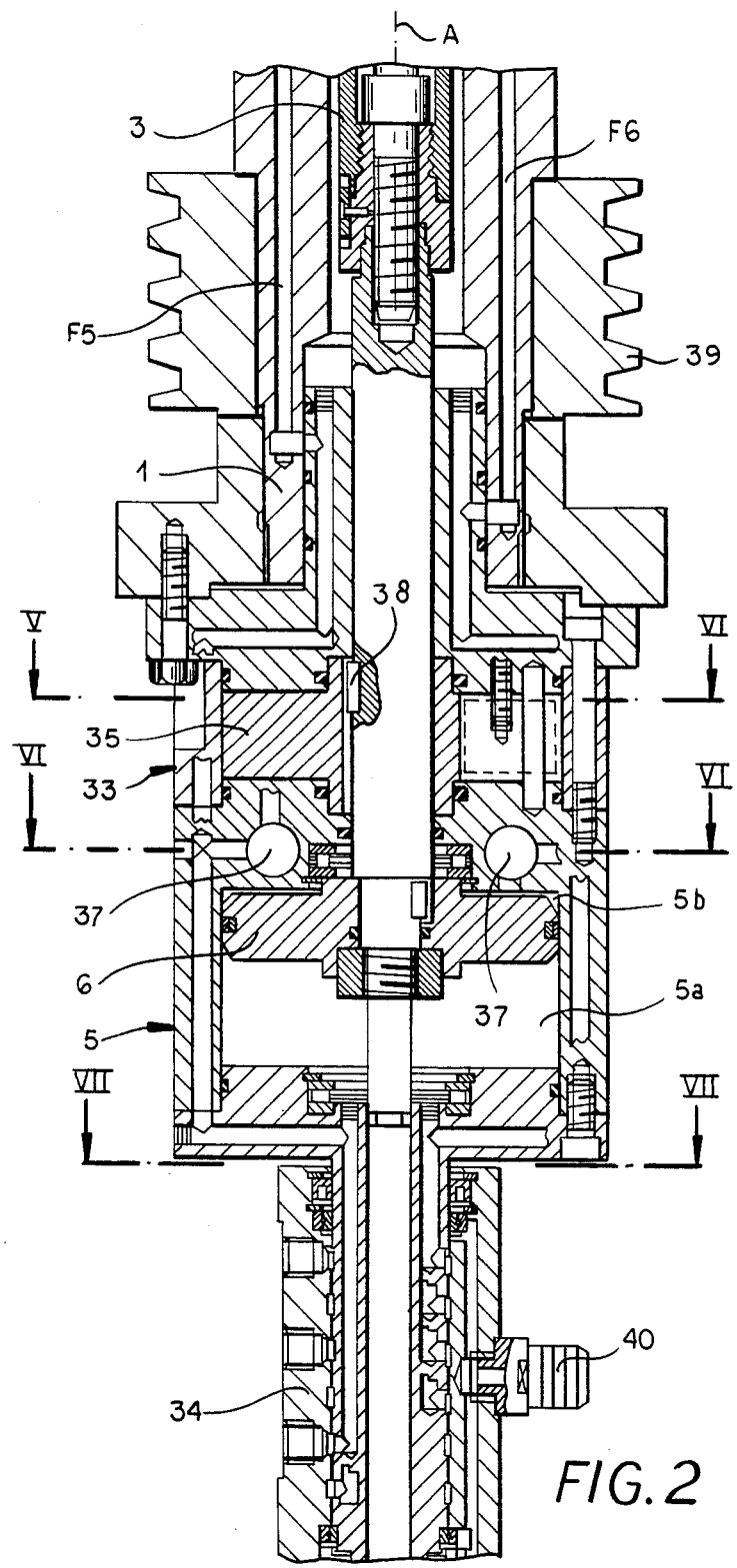
FIG. 2 is an axial section through the rear actuator end of the assembly according to this invention.
Figure 3:
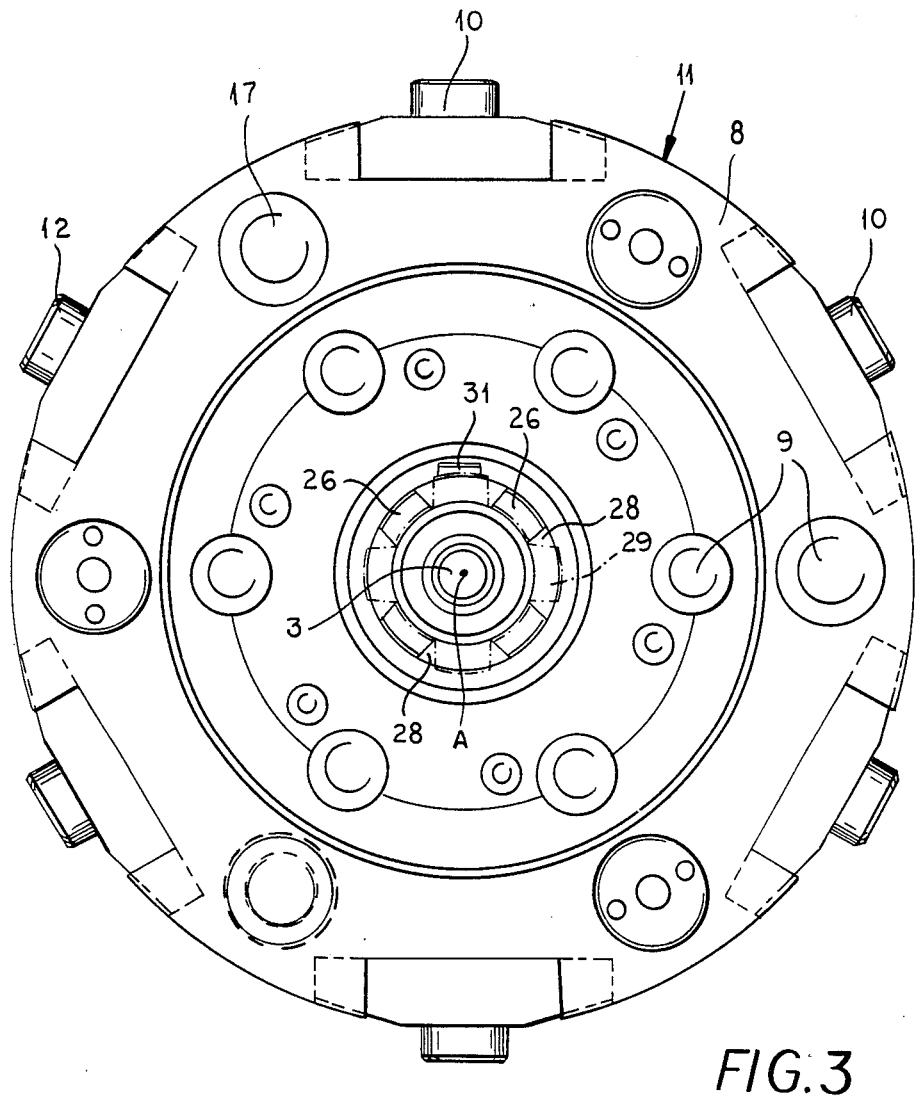
FIG. 3 i an axially front view of the coupling head, with the chuck removed for clarity of view.

The rear or outer end of the spindle 3 as shown in FIG. 2 is provided with a piston 6 axially displaceable in a double-acting hydraulic actuator cylinder 5 having a pair of compartments 5a and 5b and fixed on the outer end of the spindle 3, adjacent the pulley 39 used to rotate the spindle 1 about the axis A. The far end of the spindle 3 carries a distributor 34 provided with connection nipples 40 (only one shown) connected to various passages F1 through F6, of which passages F1 and F2 open into the compartments 5b and 5a, respectively.

The coupling head 7 has an annular body 8 secured, as mentioned above, by the bolts 9 to the front end of the spindle 3. This body 8 is formed with six equiangularly spaced cylinders 13 subdivided by respective pistons 14 into outer and inner compartments 13a and 13b connected to the passages F3 and F4. These pistons 14 are carried on bolts 10 having outer ends 12 and inner ends 36. The plate 10 is formed with a rearwardly extending cylindrical skirt 20 formed with a radially inwardly open groove 21 having a frustoconical rear flank 22. The outer ends 12 of the bolts 10, which are prevented from rotating by key-type guides 11, are beveled off at 23 complementarily to the flank 22.

The front end of the spindle 3 is provided with a fitting 25 having four angularly equispaced and radially outwardly directed teeth 26. This fitting 25 is received in a pocket 27 formed in the rear end of the element 4 and having four radially inwardly projecting teeth 28. The teeth 26 and 28 are so dimensioned that in one position it is possible for them to axially pass between each other by axial separation of the spindle 3 and element 4, whereas in a position offset 45° relative thereto they are axially engageable. Thus in one position it is possible for a pressurization of the chamber 5b (FIG. 2) to pull the spindle 3 back, to the left in FIG. 1 and down in FIG. 2, to pull the actuating element 4 in the same axially outward direction.

This eighth-turn rotation of the spindle 3 is effected by a butterfly piston 35 axially slidable along but rotationally coupled to the rod 3 by a key 38. A cylinder 33 defines two sets of compartments 33a and 33b at the butterfly piston 35 so that pressurization of one of the compartments 33a or 33b and of its diagonally opposite compartment with simultaneous depressurization of the other compartments will pivot the rod 3 one way or the other. These compartments 33a and 33b are filled or emptied by means of the passages F3 and F4.

Figure 4:
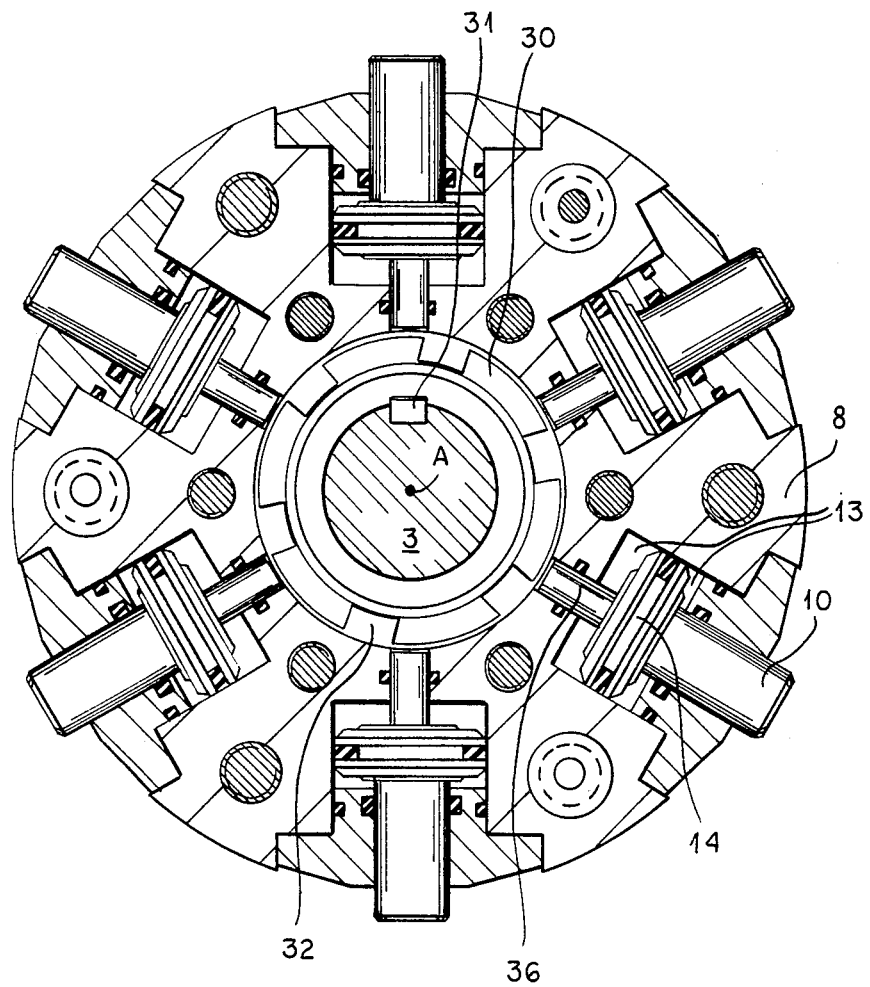
FIG. 4 is a small-scale cross section taken along line IV—IV of FIG. 1.
Figure 5:
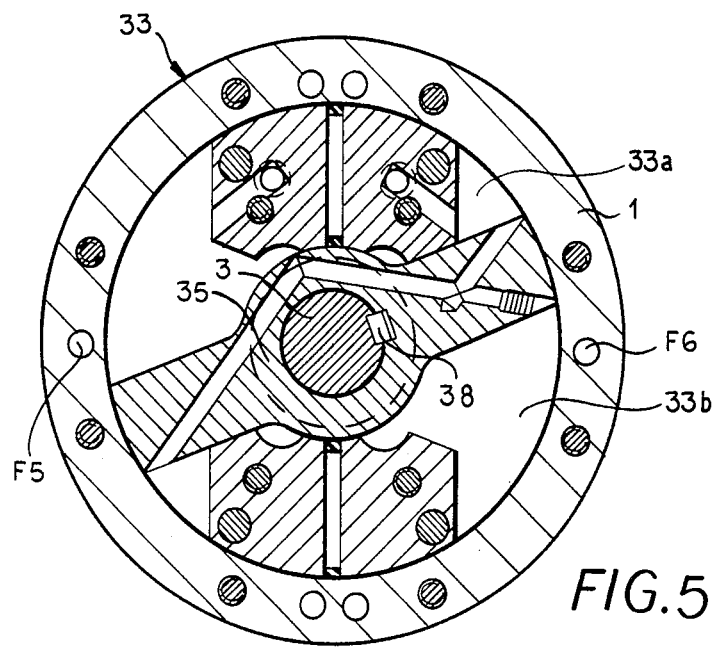
FIGS. 5, 6, and 7 are cross sections taken along respective lines V—V, VI—VI, and VII—VII of FIG. 2.
Figure 6:
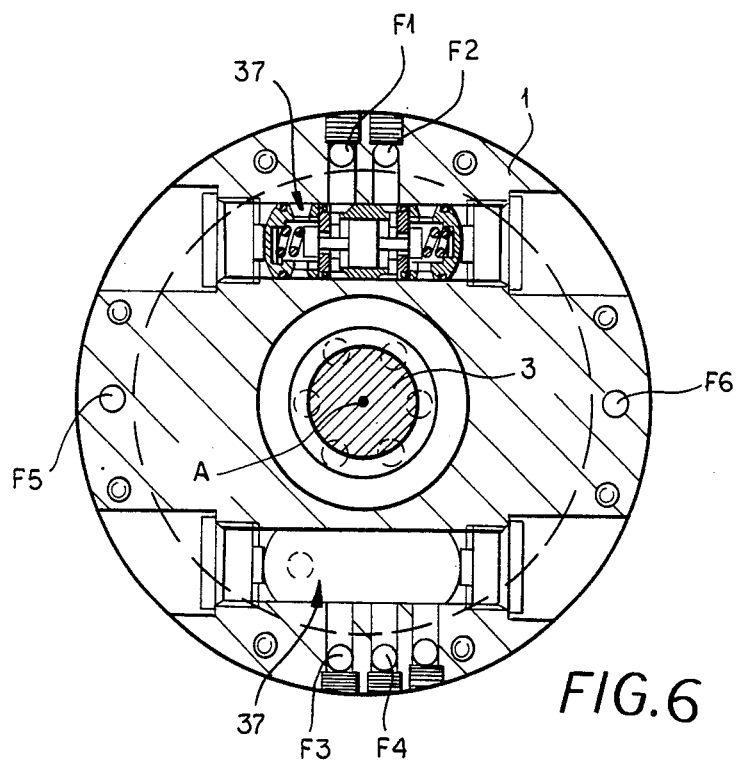
Figure 7:
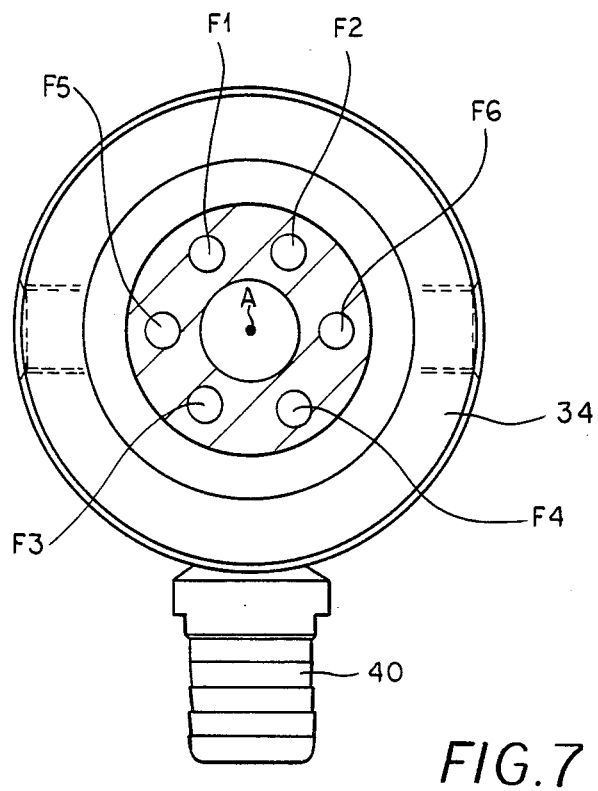

In addition the front end of the rod 3 is conected by a key 31 to a locking ring 30 that is rotatable but not axially displaceable in the coupler 7. The outer periphery of this ring 30, as shown in FIG. 4, is formed with six angularly equispaced notches 32 into which the inner ends 36 of the bolts 10 can engage. The overall radial length of each such bolt 10 is such that it cannot move into a position flush with the cylindrical outer surface of the body 8 unless its inner end 36 can fit in the respective notch 32.

Thus rotating the spindle 3 between its end positions can only take place when the bolts 10 are in the illustrated outer positions. The teeth 26 and 28 on the one hand and the notches 32 on the other are positioned such that the spindle 3 can only rotate to impede inner displacement of the bolts 10 when the teeth 26 and 28 are axially aligned.

With the system of this invention it is therefore possible to switch chucks by operating the appropriate valves to 1. Pressurize the compartment 5a and thereby disengage the teeth 26 and 28 from each other, 2. Pressurize the compartments 33a to pivot the rod 3 through 45° and thereby axially align the teeth 26 between the teeth 28 while radially aligning the inner bolt ends 36 with the notches 32.

3. Pressurize the compartments 13a and thereby retract the bolt ends 12 within the body 8, allowing the chuck 2 with its adapter plate 19 to be pulled axially forward off the coupler 7.

To mount a new chuck 2 on the head 7, the above steps are simply reversed. Obviously this sequence can be automated, so that a lathe operator need merely actuate a single control to remove and replace a chuck.

The appropriate hydraulic connections are made via the distributor 34 and double check valves 37 are provided in the lines F1-F2 and F3-F4 so that while the machine is running there is no flow into or out of the compartments 5a, 5b, 33a, or 33b. The compartments 13a and 13b can be depressurized without danger, as inward excursion of the bolts 10 is impeded by the locking ring 30.

With the system of this invention it is therefore possible to switch chucks very easily. Although very fast to use, the system will ensure solid and perfectly centered mounting of the chuck. Thus it is possible to keep an automatic lathe operating a very large percentage of the time, having saved that time normally wasted in fitting a workpiece to the headstock chuck or switched chucks. The versatility of the machine is also increased as chucks can be switched for different operations very rapidly.

I claim:

1. A power chuck assembly comprising:

a lathe spindle extending along and rotatable about an axis and having axially opposite front and rear ends;

an axially displaceable actuator rod extending at the axis through the spindle and having front and rear rod ends at the respective spindle ends, the rod being rotatable about the axis between two angularly offset end positions;

a coupling head secured to the front spindle end and having a plurality of bolts displaceable radially between inner and outer positions;

a chuck provided with an axially rearwardly projecting annular flange engageable over the head and provided with at least one radially but not axially open recess in which the bolts are engageable in the outer positions thereof;

actuating means connected to the bolts for displacing them from the inner to the outer positions so that, when the chuck is fitted over the coupling head, the bolts engage in the recess and axially lock the chuck on the coupling head;

means including an actuating element axially displaceable in the chuck for gripping and releasing a workpiece;

interengageable coupling formations on the front rod end and on the actuating element axially engageable with each other for axially coupling the rod to the element in one angular end position of the spindle and axially unengageable with each other in the other angular end position for axially decoupling the rod and element;

means including a linear actuator connected between the rear spindle and rod ends for relatively axially displacing the spindle and rod and thereby axially displacing the actuating element of a chuck engaged on the coupling head when the rod is in the one angular end position; and means incuding a rotary actuator connected between the spindle and rod for rotating the rod between its end positions and thereby axially coupling and uncoupling it from the actuating element of a chuck engaged over the head.

2. The power-chuck assembly defined in claim 1 wherein the chuck is formed with a rearwardly flaring seat and the coupling head has a complementary forwardly tapering projection snugly engageable therein with the head and body coaxial, the bolts and recess have mutually engageable surfaces forming a forwardly directed acute angle with the axis, enabling engagement of the bolts in the recess with engagement of these surfaces pulls the chuck axially backward to fit the projection into the seat.

3. The power-chuck assembly defined in claim 2 wherein the recess is a radially inwardly open groove having a rear flank forming the respective one of the surfaces, the chuck and coupling head having axially interengaging formations offset from the axis that rotationally couple the head to the chuck fitted over it.

4. The power-chuck assembly defined in claim 3 wherein the bolts have radially inner ends, the assembly further comprising a locking ring axially shiftable on but rotatably coupled to the front rod end and having a plurality of radially outwardly open notches displaceable between the rod end positions, the inner bolt ends being radially engageable in the notches for movement of the bolts into the inner positions only in the other end position of the rod and ring, the inner bolt ends being engageable radially inward against the ring between the notches and therefore being unable to move into the inner positions in the one end position of the rod and ring.

5. The power-chuck assembly defined in claim 4 wherein the actuating means includes pistons formed on the bolts and respective radially extending cylinders formed in the head around the pistons.

6. The power-chuck assembly defined in claim 2 wherein the actuating element is formed with an axially rearwardly open pocket and the coupling formations between the front rod end and actuating element include a plurality of radially outwardly projecting teeth on the front rod end in the pocket and a plurality of radially inwardly projecting teeth on the element in the pocket and displaceable in the other end position of the rod axially past and between the rod teeth.

7. The power-chuck assembly defined in claim 6 wherein the rotary actuator is between the rear spindle and rod ends and includes a vane-type piston rotationally but not axially fixed on the rod and a cylinder surrounding and defining a pair of compartments with the piston and carried on the spindle.

8. The power-chuck assembly defined in claim 7 wherein the linear actuator includes:
   a double-acting piston on the rear rod end, and
   a cylinder around and defining a pair of compartments with the double-acting piston and on the spindle rear end.

9. The power-chuck assembly defined in claim 8, further comprising
   a distributor fitting rotatably mounted on the spindle and connected therethrough to all the compartments.

10. The power-chuck assembly defined in claim 9, further comprising
    means including double check valves between the distributor and the compartments for inhibiting flow out of any compartment of either pair unless the other compartment of the respective pair is pressurized.

11. The power-chuck assembly defined in claim 2 wherein the chuck includes a chuck body, an adapter plate formed with the seat and skirt, and means securing the body and plate fixedly together.

* * * * *